(12) United States Patent
Jacobi

(10) Patent No.: US 7,954,336 B2
(45) Date of Patent: *Jun. 7, 2011

(54) THERMAL STORAGE UNIT FOR AIR CONDITIONING APPLICATIONS

(76) Inventor: Robert W. Jacobi, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/611,523

(22) Filed: Nov. 3, 2009

(65) Prior Publication Data

US 2010/0043483 A1 Feb. 25, 2010

Related U.S. Application Data

(63) Continuation of application No. 11/782,164, filed on Jul. 24, 2007, now Pat. No. 7,631,515.

(60) Provisional application No. 60/833,514, filed on Jul. 26, 2006.

(51) Int. Cl.
*F25D 17/02* (2006.01)

(52) U.S. Cl. ........................................................ 62/434

(58) Field of Classification Search .................... 62/434, 62/430; 165/164

See application file for complete search history.

(56) References Cited

U.S. PATENT DOCUMENTS

| | | | | |
|---|---|---|---|---|
| 4,149,389 A | * | 4/1979 | Hayes et al. | 62/79 |
| 4,280,335 A | * | 7/1981 | Perez et al. | 62/332 |
| 4,391,104 A | * | 7/1983 | Wendschlag | 62/79 |
| 4,646,539 A | * | 3/1987 | Taylor | 62/278 |
| 5,355,688 A | | 10/1994 | Rafalovich et al. | 62/117 |
| 5,507,337 A | | 4/1996 | Rafalovich et al. | 165/63 |
| 5,680,898 A | | 10/1997 | Rafalovich et al. | 165/236 |
| 5,735,133 A | * | 4/1998 | Voss et al. | 62/185 |
| 6,006,541 A | | 12/1999 | Taylor | 62/453 |
| 6,332,335 B1 | | 12/2001 | Kajimoto et al. | 62/434 |
| 6,877,342 B2 | | 4/2005 | Weng | 65/59 |
| 6,935,132 B1 | | 8/2005 | Urch | 62/324.1 |
| 7,631,515 B2 | * | 12/2009 | Jacobi | 62/434 |
| 2005/0217301 A1 | | 10/2005 | Iguchi et al. | 62/302 |
| 2006/0191286 A1 | | 8/2006 | Park et al. | 62/434 |

FOREIGN PATENT DOCUMENTS

EP 0 731 324 A1 9/1996

OTHER PUBLICATIONS

International Search Report from PCT/US07/74276, dated Aug. 20, 2008, 6 pgs.

* cited by examiner

*Primary Examiner* — Melvin Jones
(74) *Attorney, Agent, or Firm* — Woodard, Emhardt, Moriarty, McNett & Henry LLP

(57) ABSTRACT

Disclosed is a demand shifting thermal storage system employing a heat transfer/thermal energy storage vessel to produce and hold a phase change fluid using an air cooled/water cooled/ground coupled or evaporative condensing unit to generate the cold fluid with a separate and dependent circuit coupled to the indoor cooling load to remove heat from the HVAC or process cooling load using one or multiple indoor coils to absorb heat returning the heat to the thermal energy storage vessel to reject the space heat, cool the space and continue the cycle.

22 Claims, 4 Drawing Sheets

THERMAL STORAGE UNIT FOR AIR CONDITIONING APPLICATIONS

CROSS REFERENCES TO RELATED APPLICATIONS

This application is a continuation of application Ser. No. 11/782,164, filed Jul. 24, 2007, now U.S. Pat. No. 7,631,515 which is a Continuation-In-Part (CIP) of, and claims the benefit of, U.S. Provisional Patent Application Ser. No. 60/833,514, filed Jul. 26, 2006.

BACKGROUND OF THE INVENTION

The present invention relates in general to an air conditioning system for cooling an interior space of a structure. More specifically, the present invention relates to an air conditioning system that includes a thermal storage subassembly that can be positioned interior or exterior to the structure. In one embodiment of the present invention, the thermal storage subassembly includes a storage tank with a cold storage fluid and a pair of heat exchange coils. One coil is connected to a condensing unit as part of a refrigerant circuit for cooling of the cold storage fluid. The other coil is connected to a heat absorption coil as part of a second, separate fluid circuit. The heat absorption coil is positioned within the conditioned space. The two heat exchange coils are positioned within the same storage tank and are only "coupled" by means of the cold storage fluid.

Speaking generally with regard to heating and cooling and power consumption, one of the issues that needs to be addressed in terms of power usage is how to manage peak usage in hopes of reducing, if not eliminating, brown out conditions. Even though this may be a monumental task with numerous issues, it is nonetheless a continuing problem, especially in densely populated, high ambient temperature locations such as southern California. One of the main contributors to peak power usage is the air conditioning of homes and office buildings.

The present invention is directed to improving the efficiency of air conditioning systems and to contributing to reductions in peak power usage. The cold storage fluid of the present invention transfers cooling to the interior of the structure as heat is extracted. At night, when the outside temperature is lower and power consumption is reduced, the condensing unit of the present invention is then run in order to cool the cold storage fluid.

BRIEF SUMMARY OF THE INVENTION

Disclosed is a demand shifting thermal storage system employing a heat transfer/thermal energy storage vessel to produce and hold a phase change fluid using an air cooled/water cooled/ground coupled or evaporative condensing unit to generate the cold fluid with a separate and dependent circuit coupled to the indoor cooling load to remove heat from the HVAC or process cooling load using one or multiple indoor coils to absorb heat returning the heat to the thermal energy storage vessel to reject the space heat, cool the space and continue the cycle.

Related objects and advantages of the present invention will be apparent from the following description.

DETAILED DESCRIPTION OF THE INVENTION

Figure 1:
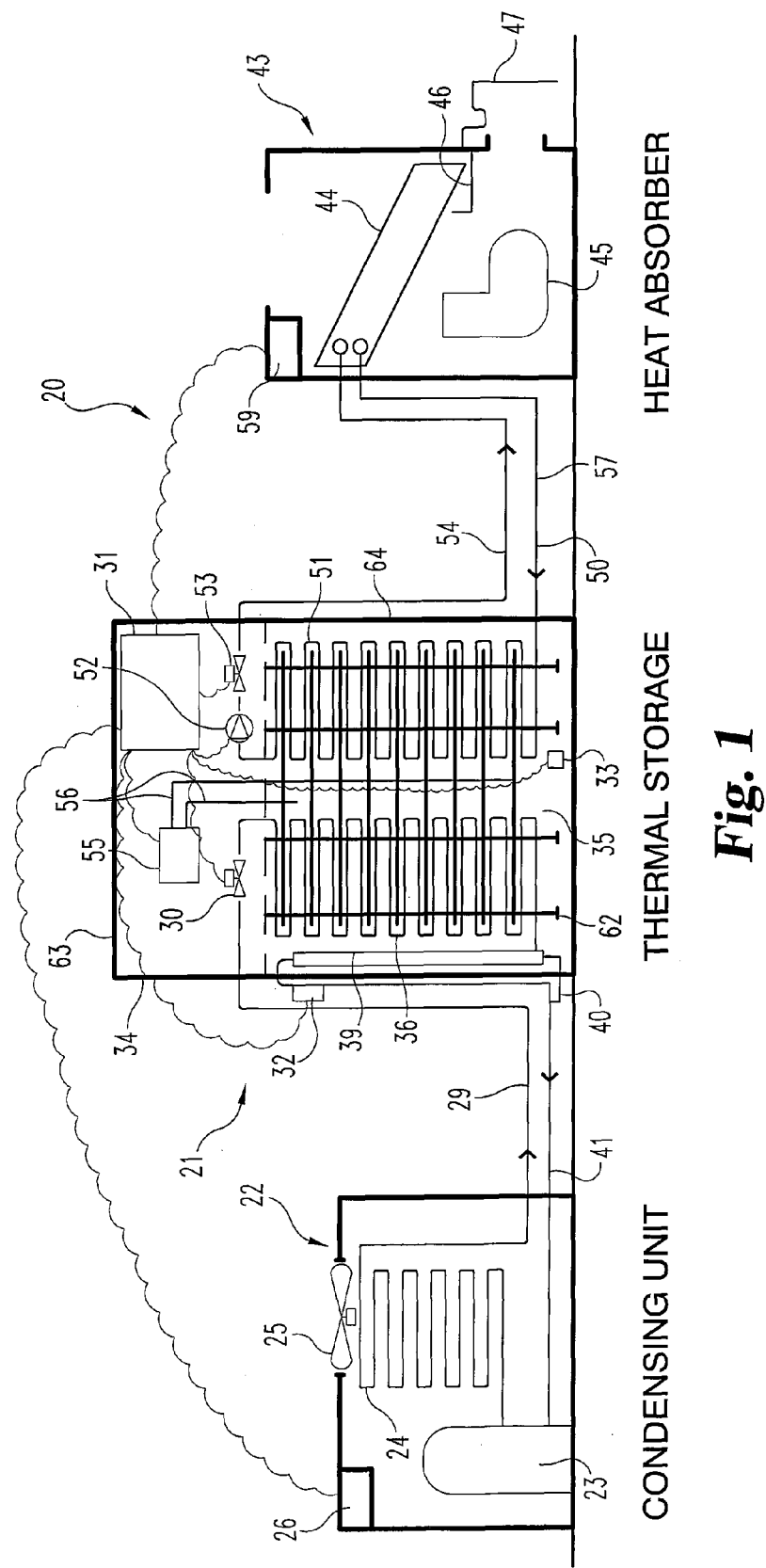
FIG. 1 is a schematic diagram of an air conditioning system according to one embodiment of the present invention in a horizontal layout.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated in schematic form an air conditioning system 20 that includes a cold storage subassembly 21. Since the focus of the present invention is directed to this cold storage subassembly 21, we are using herein the phrase "thermal energy storage" as a descriptive phrase for system 20. In brief, this thermal energy storage system 20 operates the high energy consuming compressor/condensing unit 22 during night time "off peak" hours to take advantage of reduced electrical power rates and at conditions that provide more efficient air cooled condensing unit operation due to cooler night time ambient outdoor air temperatures. The three portions of FIG. 1 include the interior space 43 of the structure where heat absorption occurs, the cold storage subassembly 21, and the condensing unit portion 22. The interior space 43 includes a typical air handling unit or furnace with an air conditioning coil, and is labeled "Heat Absorber".

This thermal energy storage system 20 includes a new or optionally, even an existing conventional residential or commercial air conditioning condensing unit 22. Unit 22 includes a compressor 23, condensing heat exchanger 24, fan 25 for condensing the heat exchanger when air cooled. The heat exchanger 24 can also be a refrigerant to water ground coupled or water cooled heat exchanger or evaporative design. Standard operating controls 26 include starters, operational and safety controls and logic control subsystems.

The liquid refrigerant leaving the condensing unit 22 flows through conduit tubing 29 delivering the liquid refrigerant to a control valve 30. Valve 30 meters the refrigerant using logic from the control panel 31 and control feedback from the refrigerant return monitor 32 and tank temperature monitor(s) 33. The refrigerant then enters the insulated thermal energy cold storage tank 34 that contains a phase change/freeze depressant fluid 35. Refrigerant circulating through the heat absorption coil 36 removes the heat from the phase change/freeze depressant fluid 35 until the fluid changes state into a partially crystalline semi-solid fluid 35.

After the removal of heat from the thermal energy cold storage fluid 35, the gaseous refrigerant leaves the heat absorption coil 36, passing through a refrigerant accumulator 39. The accumulator 39 is constructed and arranged to store excess refrigerant and capture and return refrigerant oil via an oil return line 40. Both the accumulator 39 and the refrigerant oil line 40 feed the insulated suction gas refrigerant return line 41, bringing the refrigerant back to the compressor 23/condensing unit 22. This operation continues until sufficient cold energy is stored to satisfy the operational controls and the space cooling requirements for the next day's daytime hours of operation without requiring compressor 23 or condensing unit 22 operation and thus energy usage for that function.

The thermal energy cold storage tank 34 is of sufficient size to store enough cold (energy) during night operation to supply all the cooling requirements for the conditioned interior space of the structure for typical daytime peak cooling requirements without the use of the high electrical demand caused by compressor operation. During daytime "on peak" hours of operation, a separate, independent circuit uses a refrigerant or alternatively a water-based fluid to remove heat from conditioned space using a conventional indoor heat absorption coil 44 mounted in the recirculating airstream 45. Latent heat, when present, is removed by condensation on the coil surface and collected in a catchment pan 46 to be discharged to a drain 47 or recovered for non-potable use.

The heat removed from the conditioned space (the interior of the structure) is transferred to the cold-storage fluid 35 in the thermal energy cold storage tank 34 via insulated tubing 57 as the fluid 50 enters the heat rejection coil 51. The heat transfer fluid 50 in coil 51 is circulated by pump 52 using either AC or DC current. Heat transfer flow is metered and monitored by the control valve 53 and is returned via insulated conduit 54 to the indoor coil 44 to continue the cycle whenever cooler space temperatures are required.

The thermal energy cold storage system 20 also includes a mixer 55 with piping or agitator 56 to circulate the cold storage fluid 35 and maintain uniform fluid temperature in the insulated tank 34.

A central system control panel 31 provides starting components for the refrigerant pump 52 and control logic for the refrigerant control valve 30 using the refrigerant return monitor 32. Control logic is also provided for interface to the control panel 26 in the condensing unit 22 and the control panel 59 in conditioned space 43, the heat transfer fluid control valve 53, the fluid mixer 55, and the cold storage fluid temperature monitor 33. In addition to control and monitoring of start and stop functions, the system control panel 31 includes operational control programs and algorithms for set back and daytime operation, maintenance and service programs and remote control and monitoring interface using wired and wireless communication for utility metering, monitoring and control.

During times when daytime cooling is not required, the outdoor condensing unit 22 and the thermal energy storage tank and system is in the off mode. Cold storage fluid 35 temperature is continuously sensed by monitors 33 and, when outdoor temperatures are such to reduce tank fluid 35 temperatures to their low limit, control logic turns on the circulating pump 52 and operates the blower motor 45 to put heat in the circulating fluid and warm the fluid 35 in the thermal energy cold storage tank 34 and keep temperatures above the minimum set point. An alternate method of thermal energy cold storage tank temperature increase is to use an insertion heater with line voltage power.

Additional features of system 20 include a grid system 62 for positioning and retaining coils 36 and 51 within tank 34 within the desired position so as to maximize the efficiency of the heat transfer and the spacing and distribution relative to the cold storage fluid. Another feature as an option for system 20 is an outer enclosure 63 for the storage tank 34 and its related components and structures that are part of cold storage subassembly 21. Another feature included as part of system 20 is the addition of insulation to the sidewalls 64 of tank 34.

Figure 2:
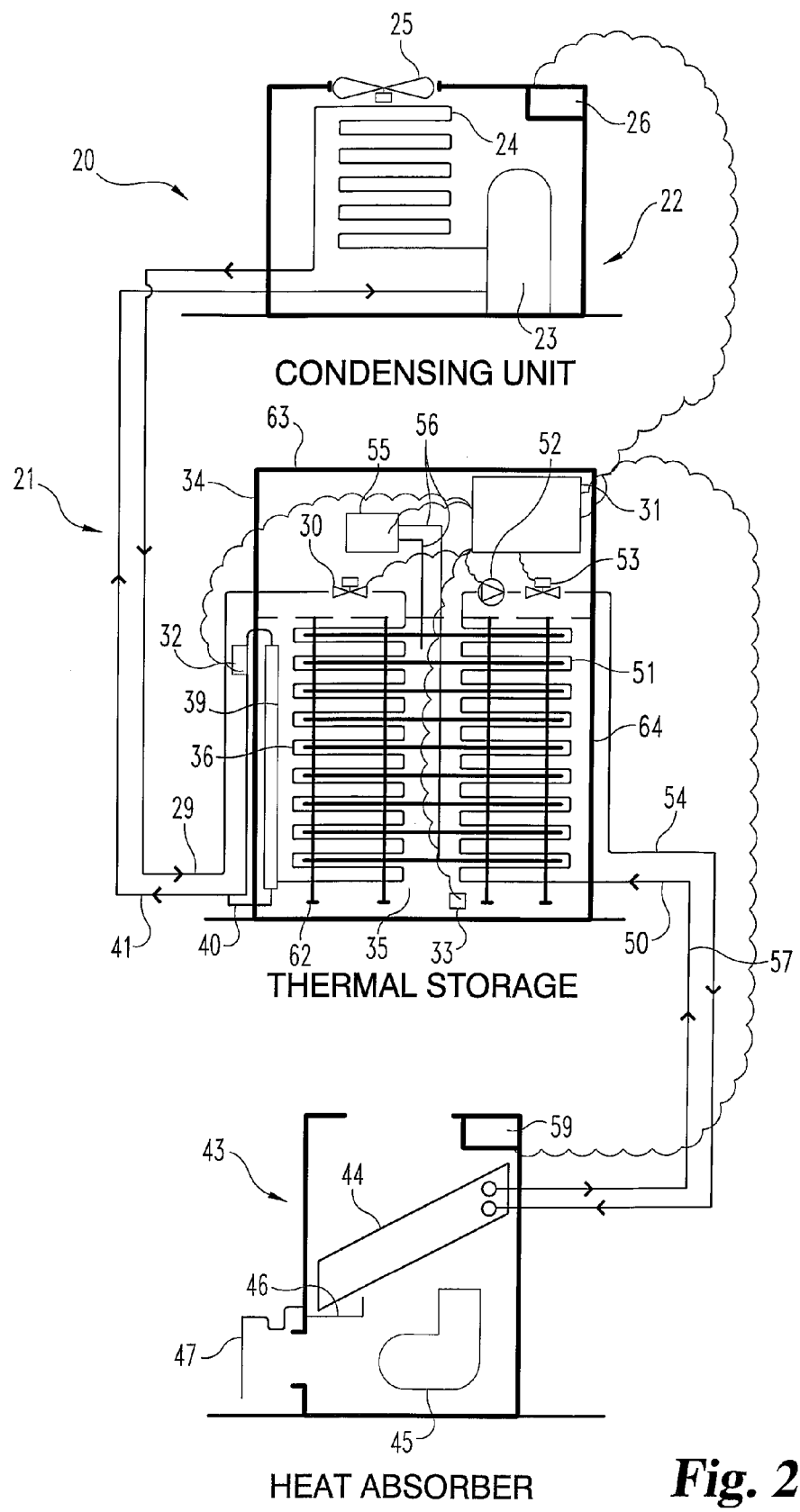
FIG. 2 is a schematic diagram of the FIG. 1 air conditioning system in a vertical layout.

Referring now to the schematic diagram of FIG. 2, it is to be noted that all of the same structures and components and all of the same reference numbers of FIG. 1 are found in FIG. 2. The only difference between FIG. 1 and FIG. 2 is in the layout of the various portions of the system. In FIG. 1, the layout is best described as horizontal or side-by-side for the primary portions of system 20. In FIG. 2, the layout of system 20 is best described as an elevated or stacked layout. Otherwise, and most important functionally, the two systems are identical.

Figure 3:
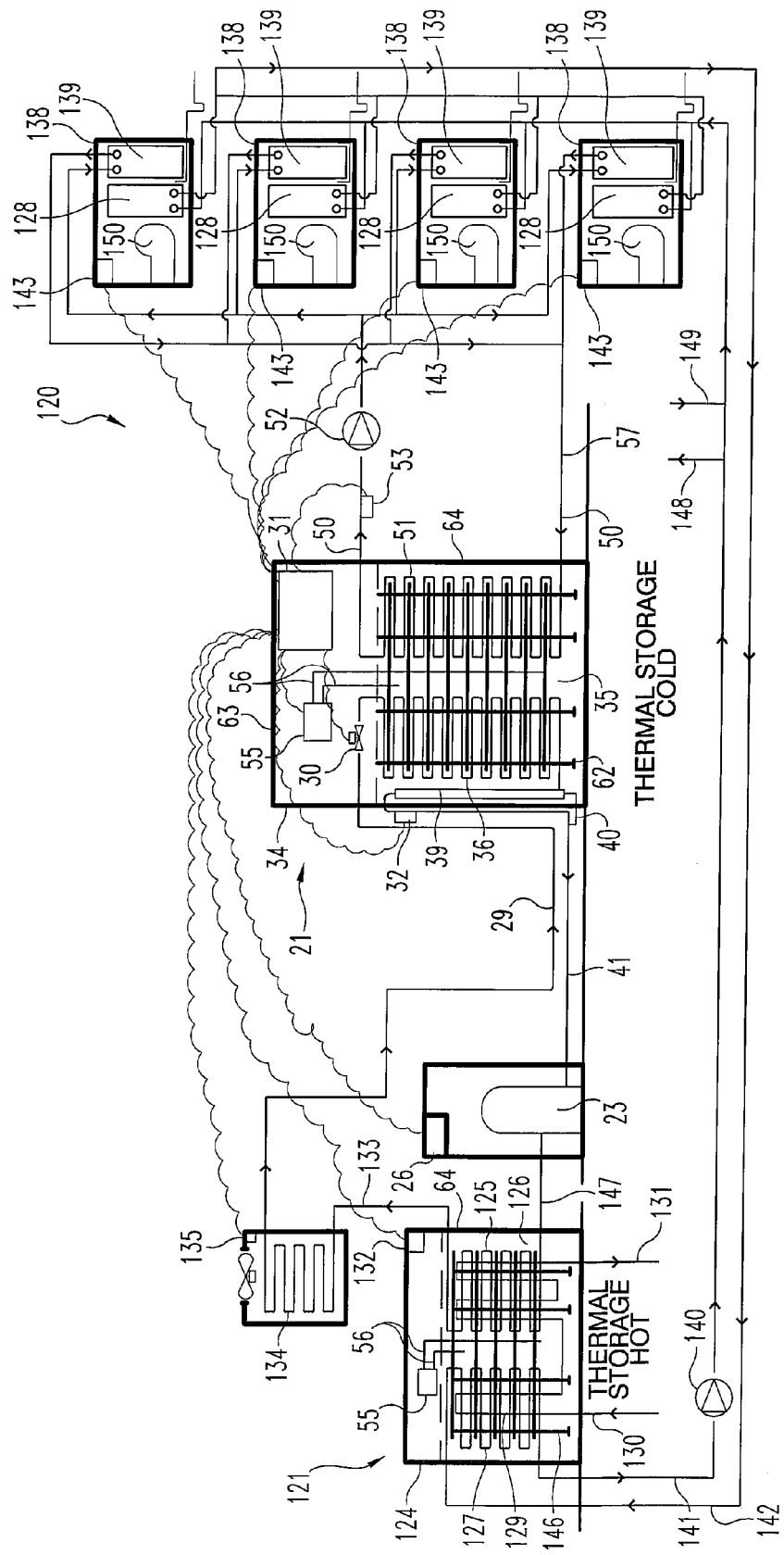
FIG. 3 is a schematic diagram of an air conditioning system according to another embodiment of the present invention.

Referring now to FIG. 3, the schematic diagram of system 120 has a number of features, components, and structures that are virtually identical to what is illustrated in FIG. 1. For these items, the same reference numerals have been used and it is to be understood that the same functioning occurs with regard to those same components. The differences between system 120 and system 20 are found principally in the structures and arrangements that are in the heat absorber portion as part of the structure interior and those that are now part of a second thermal storage subassembly 121, this one being used for "hot" storage.

The optional condenser heat recovery arrangement as shown in FIG. 3 uses many of the same structures and connections of the base thermal energy (cold) storage system 20 of FIG. 1 as well as a second insulated thermal storage tank 124 to recover and store heat energy. The insulated thermal heat storage tank 124 contains a refrigerant condenser coil 125. The condenser coil 125 is immersed in the hot storage tank 124 which contains a phase change fluid 126 to absorb the rejected condenser heat. The selected fluid 126 composition is such that it will change state and store heat in a crystalline form. A second, separate heating system coil 127 recovers heat from the phase change fluid to distribute to heating water applications such as HVAC system reheat coils 128. A third, separate independent heat reclaim coil 129 is used to recover heat to preheat city water, for example, for domestic hot water use at locations 130 and 131. The thermal energy storage tank 124 for heat recovery includes a control panel 132 for interface with the main control panel 31 and with all condenser heat rejection components, phase change energy storage control, HVAC and domestic hot water heating controls and accessories. When the refrigerant leaves the condenser heat recovery coil 125, it is piped via tubing 133 to a second condenser heat rejection coil 134 that can be an air cooled condenser, a water cooled condenser, or an evaporative condenser, and includes a control interface 135 to the central control panel 31. Refrigerant is discharged from the final condenser to interconnecting tubing 29 to the thermal energy cold storage tank 34.

The multi-indoor unit system 120 of FIG. 3 uses a water-based, hydronic cooling fluid including a freeze depressant. The cooling fluid leaves the heat rejection coil 51 and is monitored by the leaving heat transfer fluid temperature sensor 53. Hydronic fluid is circulated via a heat transfer pump 52 to multiple indoor coil/blower units 138. The fluid 50 is piped via tubing to a heat absorption/cooling coil 139 that removes heat from the conditioned space, returning the warm fluid back to the cold storage tank via tubing 57. The space conditioning blower/coil unit 138 also contains a hydronic heating coil 128 typically in the reheat position that can be used for HVAC heating or reheat for humidity control. Water is circulated by an HVAC hydronic heating pump 140. The heating/reheat coil 128 is connected to the thermal storage hot tank via heating supply piping 141 feeding the heating coils 128 from the thermal hot storage tank 124 and returned via tubing 142 to recover the condenser heat picked up by the HVAC heating coil 127 in the thermal hot storage tank 124.

In addition to recovering condenser heat for HVAC heating, a third, independent heat recovery coil 129 is used to heat/preheat city water for domestic hot water usage. Interconnecting piping 130, 131 connects directly to the water heater or hot water preheat storage tank. The heating/heat recovery system is controlled by interface between control panels in the space heating blower coil unit 143 and thermal hot storage tank control panel 132, both connected to the central control monitoring and interface box 31.

Additional components and structures of system 120 include a grid 146 for support and positioning of the coils within tank 124, tubing 147 connecting refrigerant compressor 23 and coil 125 and piping 148 and 149. Piping 148 goes to the heating system and piping 149 leads from the heating system. The blower coil unit 143 includes an indoor blower 150.

Figure 4:
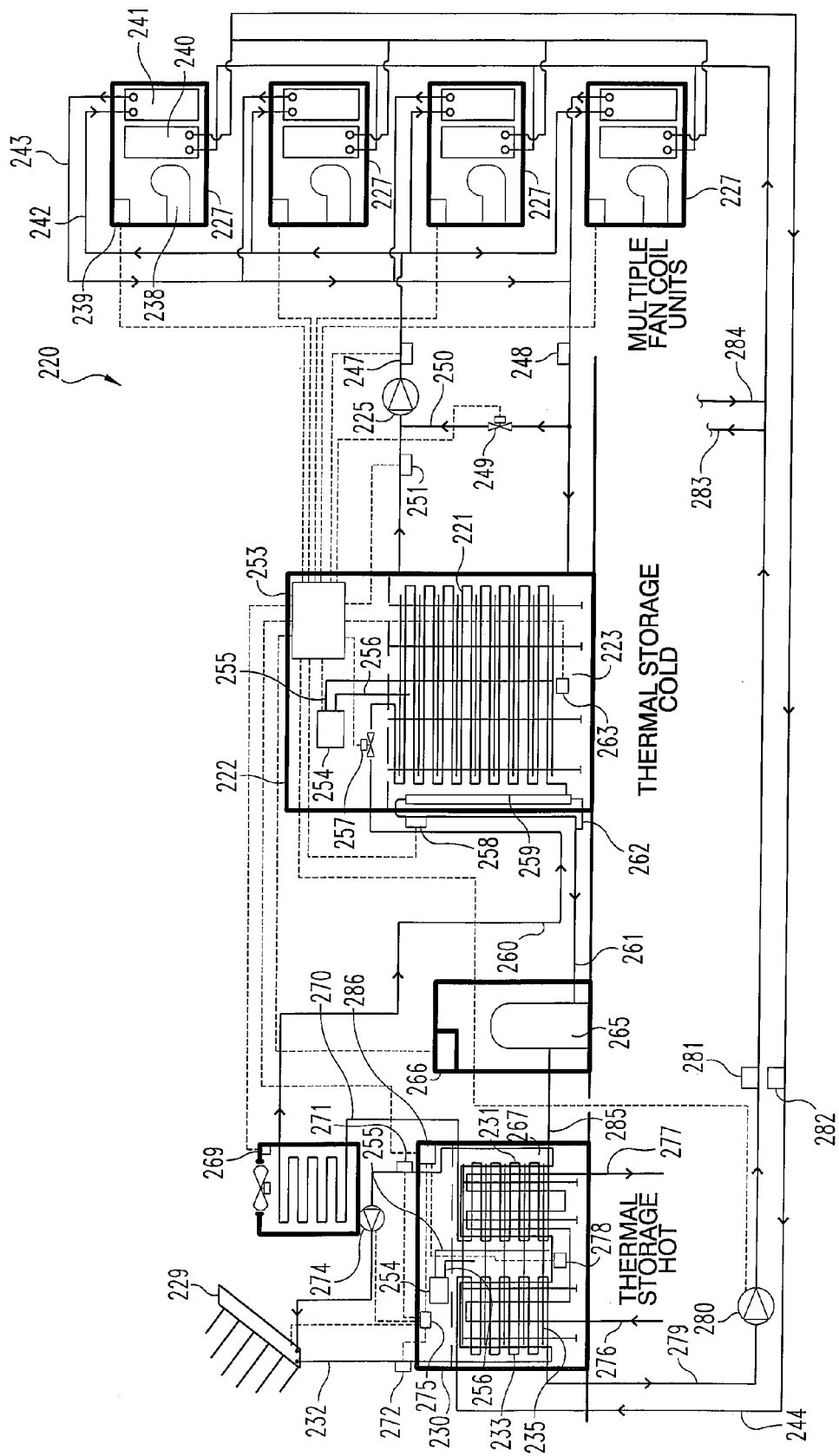
FIG. 4 is a schematic diagram of an air conditioning system according to another embodiment of the present invention.

Referring now to FIG. 4, the schematic diagram of system 220 has a number of features, components, and structures that are similar in form, fit, and function to those illustrated in FIGS. 1 and 3. However, a 200-series numbering scheme has been adopted for the FIG. 4 embodiment, due to the differences that exist within the system of FIG. 4 as compared and contrasted to the earlier embodiments of FIGS. 1 and 3.

System 220 is best described as a "demand shifting thermal storage system" employing a heat transfer/thermal energy storage tank that is used to produce and hold a phase change fluid. The system uses an air cooled/water cooled/ground coupled or evaporative condensing unit in order to generate the cold fluid with a separate and independent circuit coupled to the indoor cooling load. One design objective is to remove heat from the HVAC system of the internal space or process cooling load using one or multiple indoor coils to absorb heat. The heat being absorbed is returned to the thermal energy storage vessel (tank) as a way to reject the heat from the interior space, thereby cooling the space and thereafter continuing the cycle.

As illustrated and as described hereinafter, system 220 differs from the previous system embodiments in generally four principal or primary ways.

First, system 220 utilizes only one heat exchanger coil 221 that is located in the cold thermal energy storage tank 222. The tank 222 is filled with a cold storage fluid 223.

Secondly, the cold storage fluid 223 is a freeze depressant fluid that is a 6-7 percent propylene glycol solution that is stored in tank 222 as a slurry and maintained at approximately 27 degrees F. This fluid is used throughout the heat absorption portion of system 220, using multiple coils 241 in the conditioned space(s) 227. In operation, a portion of the warm return fluid is mixed with cold fluid drawn from the tank in order to raise the cold discharge fluid temperature until it reaches approximately between 35 and 45 degrees F. At this stage, the fluid pump 225 sends the fluid out to the heat absorption coils 241 in the space(s) 227 in order to remove heat and cool the space(s) 227. The fluid from the space(s) 227 is returned to be re-mixed and/or returned to the tank. These alternative flow paths are illustrated by the fluid conduit lines illustrated in FIG. 4.

Third, assuming that the tank 222 is properly sized for the selected space(s) 227, approximately one hundred percent (100%) of the cooling requirement for space(s) 227 can be produced during off-peak hours. The system 220 can be alternatively sized to employ a combination of off-peak storage and on-peak production and/or storage.

Fourth, since the heating derived from the operating air conditioner's condenser heat recovery is a low temperature heat, it is compatible with additional heat that can be gathered from a solar collector 229. Otherwise, this would require a fourth, independent coil in the hot thermal storage tank 230. Coil 231 for condenser heat recovery and coil 232 for solar heat storage raise the temperature in this thermal energy storage system. Coil 233 is used for HVAC heating and coil 235 is used to preheat domestic hot water.

With further reference to FIG. 4, each space 227 includes a blower 238 for the air system, a control panel 239, a reheat coil 240, and a heat absorption cooling coil 241. Fluid in is through line 242 and fluid out is through line 243. (Note: reference numbers have been omitted from the multiple spaces 227 for drawing simplicity). Lines 244 from the reheat coil in each space 227 is a return line to the heat recovery site. Line 245 into the reheat coil in each space 227 is from the heat recovery site.

Other component parts of system 220 include sensor 247 for the discharge fluid temperature, sensor 248 for the return fluid temperature, control valve 249 as part of the return fluid re-mix line 250, and sensor 251 for the fluid leaving the storage tank 222.

Other component parts more directly associated with the storage tank 222 include control monitoring and interface box 253, fluid mixer 254, mixer supply line 255, mixer return line 256, refrigerant control valve 257, refrigerant return monitor 258, accumulator 259, refrigerant feed line 260, suction gas return line 261, refrigerant oil return line 262, and sensor 263 for the cold fluid temperature.

The "thermal storage hot" side of system 220 includes refrigerant compressor 265, compressor control 266, a phase-change fluid 267 inside of tank 230, final condenser 268, final condenser control panel 269, connecting tubing 270, sensor 271 for the fluid return temperature, sensor 272 for the fluid supply temperature, and solar heating pump 274.

Additional components include solar control module 275, incoming city water line 276, exiting city water line 277, sensor 278 for the hot fluid temperature, heat supply line 279 to the HVAC heating coils, hydronic heating heat recovery pump 280, sensor 281 for the supply recovery heat temperature, sensor 282 for the return recovery heat temperature, line 283 to the heating system, line 284 from the heating system, tubing 285 from the compressor to the heat recovery compressor, and thermal heat storage control panel 286.

In FIG. 4, the conduit tubing or "lines" that establish fluid flow paths between the various tanks, supplies, and utilizing components are illustrated as solid lines. The electrical and signal connections between modules, controls, panels, sensors, etc. are illustrated as broken lines to aid in drawing clarity and understanding.

The following summary points are applicable primarily to the embodiments of FIGS. 1-3 wherein there are two heat transfer coils in the storage tank that are separate and independent from one another, though linked by the phase-change fluid positioned in the storage tank. There are though specific aspects of the points enumerated below that have applicability to system 220 as illustrated in FIG. 4.

The thermal storage vessel contains a phase change substance like water or a dilute glycol solution. The thermal storage vessel also contains two separate and independent heat transfer coils or circuits. In the charging mode, the evaporator coil in the thermal storage tank pulls the heat out of the phase change substance which is cooled to become a solid or semi-solid slurry and rejects the heat through a standard outdoor air conditioning condensing unit or any low temperature chilled water source. The second coil in the thermal energy storage tank provides heat rejection whenever the conditioned space heat absorption coil transfers the heat from the air conditioned space to the thermal storage tank changing the phase change substance back to a fluid. With two separate coils or circuits in the thermal storage tank, different refrigerants can be used in the two independent circuits to optimize both the charging (making ice or a slurry) or in discharge mode which melts the ice or slurry using the phase change from a solid or semi-solid to a liquid to provide cooling to the conditioned space.

To charge the thermal energy storage tank, the heat absorption coil with expansion device is paired with either a standard air cooled residential or commercial outdoor condensing unit or any type of low temperature chiller using either an electrically operated, compressor-driven chiller or a low temperature absorption chiller. Any oil return or liquid refrigerant return issues are solely limited to this simple circuit.

The space heat absorption circuit uses a single heat rejection coil in the thermal energy storage tank that can be connected to one or multiple indoor coils. A refrigerant or glycol pump that does not require special oils or oil recapture components is sized to handle the piping and all coil requirements.

With multiple indoor coils and an appropriately-sized thermal energy storage tank, conditioned space cooling loads can benefit from system diversity to properly size the thermal storage tank.

In high humidity locations, a low temperature refrigerant can be sent to the indoor heat absorption coil(s), providing lower cooling fluid temperatures (compared to standard air conditioning systems), therefore increasing the amount of latent heat removal and lowering the humidity levels below what can be provided by standard air conditioning systems.

The thermal energy storage tank and outdoor air conditioner or any type of low temperature chiller can be sized for one hundred percent (100%) off-peak operation with charging operation only during nighttime hours using lower temperature outside air to improve efficiency and possible lower cost energy.

An outdoor condensing unit or any type of low temperature chiller and the thermal energy storage tank can be sized for continuous 24 hour a day level load operation using both the thermal energy storage tank and simultaneous outdoor air conditioner or chiller operation to satisfy the daytime design cooling load.

If using a solar powered, low temperature absorption chiller, the tank can be sized to handle cooling duties during nighttime and cloudy days.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A space conditioning system comprising:
first heat exchange means;
second heat exchange means; and
a linking heat transfer fluid interacting with said first heat exchange means via heat transfer and interacting with said second heat exchange means via heat transfer, wherein said first heat exchange means includes a first fluid circuit and said second heat exchange means includes a second fluid circuit, said first and second fluid circuits being separate from one another.

2. The space conditioning system of claim 1, wherein said first heat exchange means includes a first coil that is constructed and arranged as part of a first fluid circuit that communicates with an interior portion of a structure.

3. The space conditioning system of claim 2 wherein said second heat exchange means includes a second coil that is constructed and arranged as part of a second fluid circuit that communicates with condensing means.

4. The space conditioning system of claim 3 wherein said linking heat transfer fluid is a phase change/freeze depressant fluid.

5. The space conditioning system of claim 4 wherein said linking heat transfer fluid and said first and second coils are positioned in a tank.

6. The space conditioning system of claim 5 which further includes an accumulator that is flow coupled with said second coil.

7. The space conditioning system of claim 6 wherein said second heat exchange circuit handles a refrigerant and said accumulator is constructed and arranged to store excess refrigerant.

8. The space conditioning system of claim 7 wherein said condensing means includes a heat exchanger.

9. A space conditioning system comprising:
heat absorber means;
a thermal storage unit;
heat rejection means; and
wherein said thermal storage unit including first heat transfer means cooperatively arranged with said heat absorber means and second heat transfer means cooperatively arranged with said heat rejection means and with said first heat transfer means, said first heat transfer means being thermally linked to said second heat transfer means via a fluid in said thermal storage unit.

10. The space conditioning of claim 9 wherein said first heat transfer means includes a first coil that is constructed and arranged as part of first fluid means that communicates with an interior portion of a structure.

11. The space conditioning system of claim 10 wherein said second heat transfer means includes a second coil that is constructed and arranged as part of second fluid means that communicates with a condenser heat rejection coil.

12. The space conditioning system of claim 11 wherein said fluid in said thermal storage unit is a phase change/freeze depressant fluid.

13. The space conditioning system of claim 12 which further includes an accumulator that is flow coupled with said second coil.

14. The space conditioning system of claim 13 wherein said second fluid circuit handles a refrigerant and said accumulator is constructed and arranged to store excess refrigerant.

15. The space conditioning system of claim 14 wherein said interior includes a plurality of space conditioning units, each unit including a heat absorption/cooling coil.

16. A space conditioning system comprising:
an enclosure containing a heat transfer fluid;
first heat exchange means having a first portion positioned within said heat transfer fluid; and
second heat exchange means having a second portion positioned within said heat transfer fluid, said first and second portions being linked via said heat transfer fluid, wherein said first heat exchange means includes a first fluid circuit and said second heat exchange means includes a second fluid circuit, said first and second fluid circuits being independent circuits enabling the use of one refrigerant in one fluid circuit and a different refrigerant in the other fluid circuit.

17. A space conditioning system comprising:
first heat exchange means wherein said first heat exchange means including a first coil that is constructed and arranged as part of a first fluid circuit that communicates with an interior portion of a structure;

second heat exchange means including a second coil that is constructed and arranged as part of a second fluid circuit that communicates with condensing means;

a linking heat transfer fluid interacting with said first heat exchange means via heat transfer and interacting with said second heat exchange means via heat transfer, wherein said linking heat transfer fluid is a phase change/freeze depressant fluid and wherein said linking heat transfer fluid and said first and second coils are positioned in a tank; and an accumulator that is flow coupled with said second coil.

18. The space conditioning system of claim 17 wherein said second heat exchange circuit handles a refrigerant and said accumulator is constructed and arranged to store excess refrigerant.

19. The space conditioning system of claim 18 wherein said condensing means includes a heat exchanger.

20. A space conditioning system comprising:
first heat exchange means;
second heat exchange means;
a linking heat transfer fluid interacting with said first heat exchange means via heat transfer and interacting with said second heat exchange means via heat transfer; and an accumulator that is flow coupled with a coil which is part of said second heat exchange means.

21. A space conditioning system comprising:
first heat exchange means;
second heat exchange means; and
a linking heat transfer fluid interacting with said first heat exchange means via heat transfer and interacting with said second heat exchange means via heat transfer, wherein said first heat exchange means includes a portion which is interior to a structure and said second heat exchange means includes a portion which is located outdoors.

22. A space conditioning system comprising:
first heat exchange means including a heat absorption coil and a heat rejection coil;
second heat exchange means including a condensing heat exchanger and a heat absorption coil; and
a linking heat transfer fluid interacting with said first heat exchange means via heat transfer and interacting with said second heat exchange means via heat transfer.

\* \* \* \* \*